L. ARNOLD.
CONSTANT CURRENT TRANSFORMER.
APPLICATION FILED DEC. 13, 1915.
1,263,360.
Patented Apr. 23, 1918.
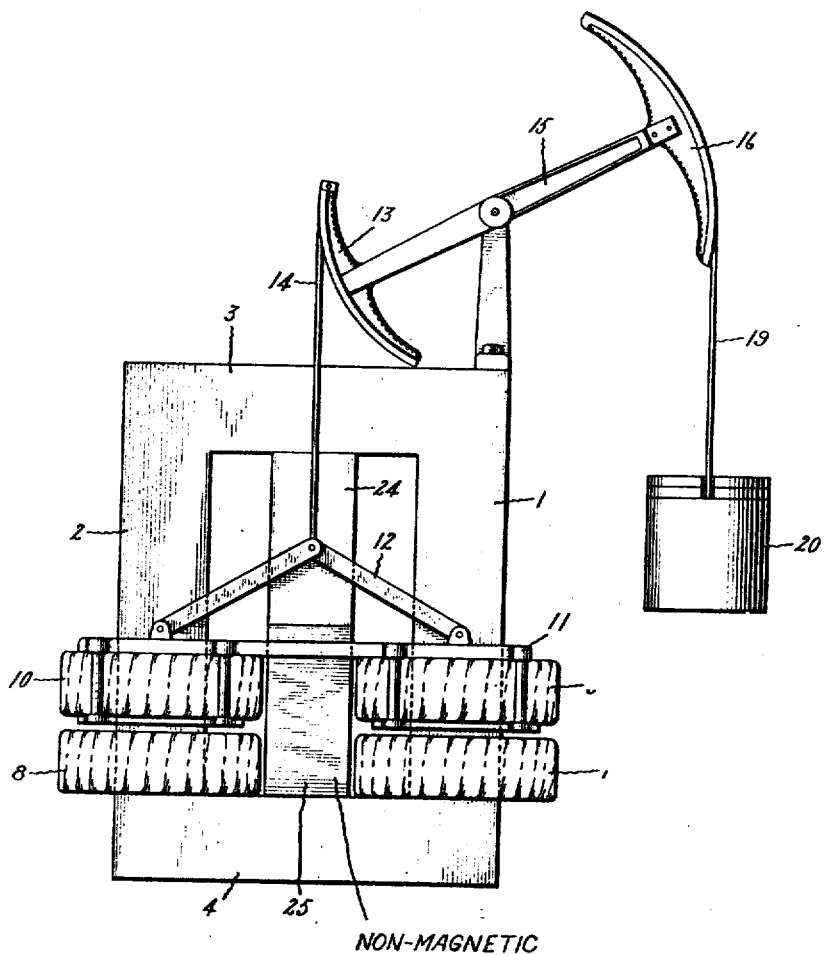
Inventor:
Lyman Arnold,
by *(signature)*
His Attorney

UNITED STATES PATENT OFFICE.

LYMAN ARNOLD, OF LYNN, MASSACHUSETTS, ASSIGNOR TO GENERAL ELECTRIC COMPANY, A CORPORATION OF NEW YORK.

CONSTANT-CURRENT TRANSFORMER.

1,263,360.  Specification of Letters Patent.  Patented Apr. 23, 1918.

Application filed December 13, 1915. Serial No. 66,469.

*To all whom it may concern:*

Be it known that I, LYMAN ARNOLD, a citizen of the United States, residing at Lynn, in the county of Essex, State of Massachusetts, have invented certain new and useful Improvements in Constant-Current Transformers, of which the following is a specification.

My invention relates to that type of electrical devices known as constant current transformers.

These transformers comprise in general, a core and inductively related primary and secondary windings thereon, one of such windings being fixed and the other being movable relative thereto. The electromotive force induced in the secondary winding is varied by moving the movable winding to and from the fixed winding to vary the leakage flux between the two windings, that is the flux that links one winding without linking the other; as the windings are separated, the leakage is increased and the induced electromotive force decreased, and when the windings are moved nearer each other, the opposite effects are observed. In a simple device of this character, the maximum voltage variation it is possible to obtain, depends substantially upon the distance the windings may be separated, and since the core must at all times link the two windings, its length, and the size of any tank or housing for the device that may be used, depend upon the amount of movement required of the coils. Furthermore, an extended range of movement entails certain difficulties in the construction of such guides and such counterbalancing and carrying devices for the movable coils as it may be desirable to use.

The object of my invention is to secure a different change in induced electromotive force with a given movement of the movable windings than is secured in the simple apparatus above indicated, generally to reduce the size of the apparatus. More particularly, an object of my invention is to secure a greater change in induced electromotive force for a given range of movement of the movable windings than is secured in such simple apparatus in order to reduce the length of the apparatus. I do this by providing a magnetic shunt for partially bridging the gap between the primary and secondary windings, and I locate this shunt at the end of the core remote from the fixed winding where it will facilitate increasing the leakage flux as the windings separate when I wish to reduce the length of the apparatus. In the particular embodiment of my invention which I have illustrated the constant current transformer comprises a plurality of movable windings with a corresponding plurality of fixed windings, and a magnetic shunt for partially bridging the gaps between the movable and fixed windings as the windings are separated.

The single figure in the accompanying drawing illustrates, in elevation, more or less diagrammatically, such a constant current transformer.

The core primarily provides a complete magnetic circuit comprising two legs 1 and 2 connected by yokes 3 and 4. About one end of the leg 1 is a fixed winding 7 and about the corresponding end of the leg 2 is a fixed winding 8. These windings 7 and 8 are fixed adjacent the yoke 4. The movable windings comprise the windings 9 about the leg 1, and 10 about the leg 2. These windings are adapted to move along their respective legs 1 and 2 to and from their respective fixed windings 7 and 8. It is immaterial to my present invention which windings of the respective pairs on each leg are primary windings and which are secondary windings. The two movable windings 9 and 10 are joined together by and fixed to the plate 11 which, through suitable mechanism 12, is connected to the usual sector 13 by means of the cords 14. This sector is at one end of the arm 15 pivoted near its center and carrying, at its other end, a sector 16. The cords 19 are fixed to and passed over the sector 16 and carry a suitable counter-weight 20. The use of the cords, sectors, and counter-weight are well known.

Between the two legs 1 and 2 of the core is located the magnetic shunt 24. This shunt extends from the yoke 3, that is adjacent the upper ends of the legs 1 and 2, downward toward the yoke 4. Between the lower end of the magnetic shunt 24 and the yoke 4 may be placed a support or block 25 of any suitable non-magnetic material, for example, wood. The length of the magnetic shunt 24 will depend upon the considerations of each case, such as the amount of reactances required as the windings separate.

It will be observed when the windings and 10 are in substantially their lowermost position, that is, adjacent the fixed windings 7 and 8, that the magnetic shunt 24 has little or no effect upon the leakage flux between the respective fixed and movable windings. The shunt 24 does, however, increase the amount of magnetic flux across the winding space and above the windings 9 and 10 when these windings are in their lower positions, as illustrated. As the movable windings rise into this portion of the winding space, therefore, the leakage flux between the two windings increases at a greater rate (for a given movement of the movable windings) than with the shunt 24 omitted. For a given range of movement, therefore, there exists a greater difference between the electromotive forces induced in the secondary windings, and hence, to secure a certain electromotive force variation, the whole device may be shorter than heretofore.

While I have described the principle of my invention and the best mode I have contemplated for applying this principle, other modifications will occur to those skilled in this art and I aim in the appended claims to cover all modifications which do not involve a departure from the spirit and scope of my invention.

What I claim as new and desire to secure by Letters Patent of the United States, is:—

1. A constant current transformer comprising the combination with a core having a leg, a winding about and fixed adjacent one end of said leg, and a second winding about and movable along said leg, of a magnetic shunt shorter than said leg extending from adjacent one end of said leg toward and terminating a material distance from the other end thereof.

2. A constant current transformer comprising the combination with a core having a leg, a winding about and fixed adjacent one end of said leg, and a second winding about and movable along said leg, of a magnetic shunt shorter than said leg located adjacent and substantially parallel to the portion of said leg remote from said fixed winding, said shunt terminating a material distance from the fixed winding end of said leg.

3. A constant current transformer comprising the combination with a core having a leg, a winding about and fixed adjacent one end of said leg, and a second winding about and movable along said leg, of a magnetic shunt bridging an increasingly greater part of the gap between said windings as said windings are more widely separated.

4. A constant current transformer comprising the combination with a core having a plurality of legs and yokes joining said legs, a fixed winding about each of said legs, said windings being fixed adjacent one of said yokes, and a movable winding about and movable along each of said legs between the fixed windings and the opposite yoke, of a magnetic shunt shorter than said legs extending from the yoke remote from said fixed windings toward and terminating a material distance from the yoke adjacent the fixed windings.

5. A constant current transformer comprising the combination with a core having a plurality of legs and yokes joining said legs, a fixed winding about each of said legs, said windings being fixed adjacent one of said yokes, and a movable winding about and movable along each of said legs between the fixed windings and the opposite yoke, of a magnetic shunt shorter than said legs extending from the yoke remote from said fixed windings toward and terminating a material distance from the yoke adjacent the fixed windings and a single counterbalancing device for all said movable windings.

6. A constant current transformer comprising the combination with a core having a plurality of legs and yokes joining said legs, a fixed winding about each of said legs, said windings being fixed adjacent one of said yokes, and a movable winding about and movable along each of said legs between the fixed windings and the opposite yoke, of a magnetic shunt shorter than said legs extending from the yoke remote from said fixed windings toward and terminating a material distance from the yoke adjacent the fixed windings and means requiring the movable windings to move together.

In witness whereof, I have hereunto set my hand this 9th day of December, 1915.

LYMAN ARNOLD.